United States Patent
Shionoya et al.

(10) Patent No.: US 7,725,400 B2
(45) Date of Patent: May 25, 2010

(54) METHOD FOR MANAGING VIEWING OF A PARTICULAR CONTENT RECORDED ON AN INFORMATION RECORDING MEDIUM

(75) Inventors: Mitsutoshi Shionoya, Tokyo (JP); Hiroshi Uchikoga, Tokyo (JP); Ei Imai, Tokyo (JP)

(73) Assignee: Visionaire Corporation, Tokyo (JP)

(*) Notice: Subject to any disclaimer, the term of this patent is extended or adjusted under 35 U.S.C. 154(b) by 489 days.

(21) Appl. No.: 10/533,875

(22) PCT Filed: Nov. 4, 2003

(86) PCT No.: PCT/JP03/14067
§ 371 (c)(1),
(2), (4) Date: May 5, 2005

(87) PCT Pub. No.: WO2004/043066
PCT Pub. Date: May 21, 2004

(65) Prior Publication Data
US 2006/0117158 A1 Jun. 1, 2006

(30) Foreign Application Priority Data
Nov. 5, 2002 (JP) .............................. 2002-321338

(51) Int. Cl.
*G06F 21/00* (2006.01)
(52) U.S. Cl. .................. 705/59; 726/1; 726/3; 726/26; 726/27; 713/168; 713/182; 713/155; 713/185; 713/193; 380/279; 380/201; 380/202; 380/203
(58) Field of Classification Search ............ 705/50–79; 380/4, 201–203; 713/168, 1, 2, 170, 200, 713/201; 726/1, 3, 26, 27; 709/219, 220, 709/222–225, 228, 229; 707/202–203, 6–9, 707/219
See application file for complete search history.

(56) References Cited

U.S. PATENT DOCUMENTS 4,757,534 A * 7/1988 Matyas et al. ................. 705/56

(Continued)

FOREIGN PATENT DOCUMENTS

JP  2001-078139  3/2001

(Continued)

*Primary Examiner*—Andrew J. Fischer
*Assistant Examiner*—Mamon Obeid
(74) *Attorney, Agent, or Firm*—Sterne, Kessler, Goldstein & Fox P.L.L.C.

(57) ABSTRACT

A DVD player 11 reads disc control information recorded on a DVD medium M and causes a display 12 to display a start menu screen, thereby prompting a viewer to perform authentication (1). The viewer uses a remote controller 11a to display a first viewer authentication screen (2). Then, an acquisition code is indicated and an input of a password is requested. Here, the viewer uses a mobile telephone 13 to access the website indicated by an URL shown on the first viewer authentication screen (substantially, a server computer 2) and inputs a user ID and an acquisition code, thereby acquiring a password required for viewing the content of the DVD medium M ((3) and (4)). The viewer inputs the acquired password into the first viewer authentication screen (5). While a program recorded on the DVD medium M is executed, the DVD player 11 authenticates the password which has been input. If the password is judged to be valid, reproduction of the specified content is started.

9 Claims, 11 Drawing Sheets

U.S. PATENT DOCUMENTS

| | | | |
|---|---|---|---|
| 5,065,429 A * | 11/1991 | Lang | 705/56 |
| 5,416,840 A * | 5/1995 | Cane et al. | 705/52 |
| 5,581,547 A * | 12/1996 | Umeda et al. | 370/342 |
| 6,631,359 B1 * | 10/2003 | Braitberg et al. | 705/50 |
| 6,684,240 B1 * | 1/2004 | Goddard | 709/217 |
| 6,799,277 B2 * | 9/2004 | Colvin | 726/22 |
| 6,831,570 B2 * | 12/2004 | Barile et al. | 340/825.69 |
| 2002/0129254 A1 * | 9/2002 | Kuroda | 713/176 |
| 2002/0144116 A1 * | 10/2002 | Giobbi | 713/168 |
| 2003/0016827 A1 * | 1/2003 | Asano et al. | 380/277 |

FOREIGN PATENT DOCUMENTS

| | | |
|---|---|---|
| JP | 2001-307427 | 11/2001 |
| JP | 2002-073396 | 3/2002 |
| JP | 2002-218405 | 8/2002 |
| JP | 2002-279727 | 9/2002 |

* cited by examiner

FIG.3

MENU
- ◇ VIDEO 1 (WITH PREVIEW)
- ◆ VIDEO 1 (WITHOUT PREVIEW)
- ◇ VIDEO 2
- ◇ FREE VIDEO
- ◇ HOW TO USE

METHOD FOR MANAGING VIEWING OF A PARTICULAR CONTENT RECORDED ON AN INFORMATION RECORDING MEDIUM

CROSS-REFERENCES

BACKGROUND

The present invention relates to a viewing management method of a specified content recorded on an information recording medium such as a DVD.

DVD is a high capacity recording medium (media) that is currently becoming mainstream, and is used for recording audio/visual contents data such as computer programs and movies. A DVD-ROM is a playback-only disk, and DVD-Video and DVD-Audio are prescribed as the application formats thereof. A DVD-Video is a video format prescribed for use in recording audio/visual contents.

In addition to being able to record contents data such as actual images and sounds, a DVD-Video is able to record control information for realizing the viewing regulation function or special reproduction function. For example, with parental reproduction, which is one of the viewing regulation functions, a parental level is set according to age in consideration of the nature of the content. Further, DVD-Video is prescribed with a region code showing the areas where such content can be reproduced, and reproduction is permitted only when the region codes of the drive device, video reproduction device (player) and media all coincide.

SUMMARY

As described above, although the DVD-Video is prescribed with various viewing regulation functions in terms of specification, from the perspective of media providers providing DVD media to users, this was not necessarily sufficient upon engaging in more detailed viewing regulations or viewing management (hereinafter simply referred to as "viewing management"). For example, there were requests from media providers for setting a time limit for viewing the contents, or enabling viewing management by performing user authentication prior to the reproduction of the content, and requests for enabling the charge in association with this user authentication.

As one technology for realizing this kind of detailed viewing management, for example, "DVD MAGIC" proposed by the applicant is known. This DVD MAGIC "locks" the DVD media to be distributed to the users, and, upon reproduction, the user acquires a key from the media provider's site on the Internet and unlocks the DVD media to enable reproduction. According to this DVD MAGIC, since the user will access the media provider's site upon reproduction of the DVD media, there is a merit in that the media provider will be able to lead users to contents other than the intended content naturally, and supplement the users' viewing activities. For example, the gazette of Japanese Patent Laid-Open Publication No. 2002-218405 discloses an example employing this DVD MAGIC.

Nevertheless, this DVD MAGIC was originally developed based on personal computers, and general DVD players currently on the market were not able to realize the mechanism or function for performing a more detailed viewing management as with DVD MAGIC. Meanwhile, to newly incorporate a scheme for performing viewing management in general DVD players is unrealistic when considering the compatibility with many of the DVD players on the market, and there are restrictions of giving utmost concern to the specification.

Thus, an object of the present invention is to provide a viewing management function in a simple manner while giving consideration to the compatibility with existing visual reproduction devices.

The gist of the present invention is a viewing management method for managing the viewing of a content recorded on an information recording medium readable/reproducible with a prescribed reproduction device, wherein an acquisition code prerecorded on an information recording medium is presented to a viewer wishing to view a viewing management target content, the viewer is urged to enter the password, authentication is performed regarding the password input and acquired by the viewer from a server computer based on the presented acquisition code, and, when it is judged that the password is valid as a result of the authentication, the reproduction of the viewing management target content is started.

Here, it is preferable that the viewer uses an information terminal device such as a mobile telephone to access the server computer, and to acquire the password in exchange for the acquisition code. Moreover, when the viewer acquires the password from the server computer, it is desirable to charge the viewing fee of the viewing management target to the viewer.

More specifically, the present invention according to the first perspective for achieving the foregoing object is a viewing management method for managing the viewing of a content recorded on an information recording medium readable with a prescribed reproduction device, comprising: a step of the prescribed reproduction device that started reading the information recording medium presenting a prescribed acquisition code to a viewer, and urging the viewer to input a prescribed password; a step of a prescribed server computer accessed by the information terminal device of the viewer according to prescribed position information urging the viewer to input the prescribed acquisition code; a step of the prescribed server computer presenting a password corresponding to the prescribed acquisition code to the viewer upon receiving the prescribed acquisition code from the information terminal device of the viewer; a step of the prescribed reproduction device performing authentication based on the received prescribed password upon receiving the prescribed password from the viewer; and a step of the prescribed reproduction device starting the reproduction of the content recorded on the information recording medium when it judges that the received prescribed password is valid.

Here, it is preferable that a password management table associating the password with the prescribed acquisition code is recorded on the information recording medium, and the prescribed reproduction device presents a prescribed acquisition code corresponding to the random number generated according to a prescribed random function.

Further, it is preferable that the server computer comprises a viewing management database containing a table corresponding to the password management table, and by referring to the viewing management database, a prescribed password corresponding to the prescribed acquisition code received from the information terminal device of the viewer is specified, and presented to the viewer.

Moreover, it is preferable that prescribed position information is recorded on the information recording medium, and the prescribed reproduction device presents the prescribed acquisition code together with the prescribed position information.

Further, it is preferable that the viewing management method further comprises a step of urging the viewer to select a viewing management target content before presenting the acquisition code, and when the viewing management target content is selected, the prescribed acquisition code corresponding to the selected viewing management target content is presented.

Moreover, the present invention according to the second perspective is an information recording medium readable with a prescribed reproduction device, wherein the information recording medium is used for recording a viewing management target content, a prescribed password management table and prescribed control information, a prescribed password is associated with a prescribed acquisition code in the prescribed password management table, and the prescribed control information causes the prescribed reproduction device to realize: a function of presenting the prescribed acquisition code to the viewer and urging the viewer to input the prescribed password, a function of, when the viewer inputs the prescribed password, performing authentication of the input prescribed password, and a function of reproducing the viewing management target content according to the result of the authentication.

DESCRIPTION OF THE DRAWINGS

FIG. 3 is a diagram showing an example of the activation menu screen according to an embodiment of the present invention;

DETAILED DESCRIPTION

Next, the embodiments of the present invention are now explained with reference to the drawings. In the following embodiment, although an explanation is made employing a DVD media, there is no particular limitation, and the present invention can also be employed in other medias such as CD-ROMs or next-generation media.

Figure 1:
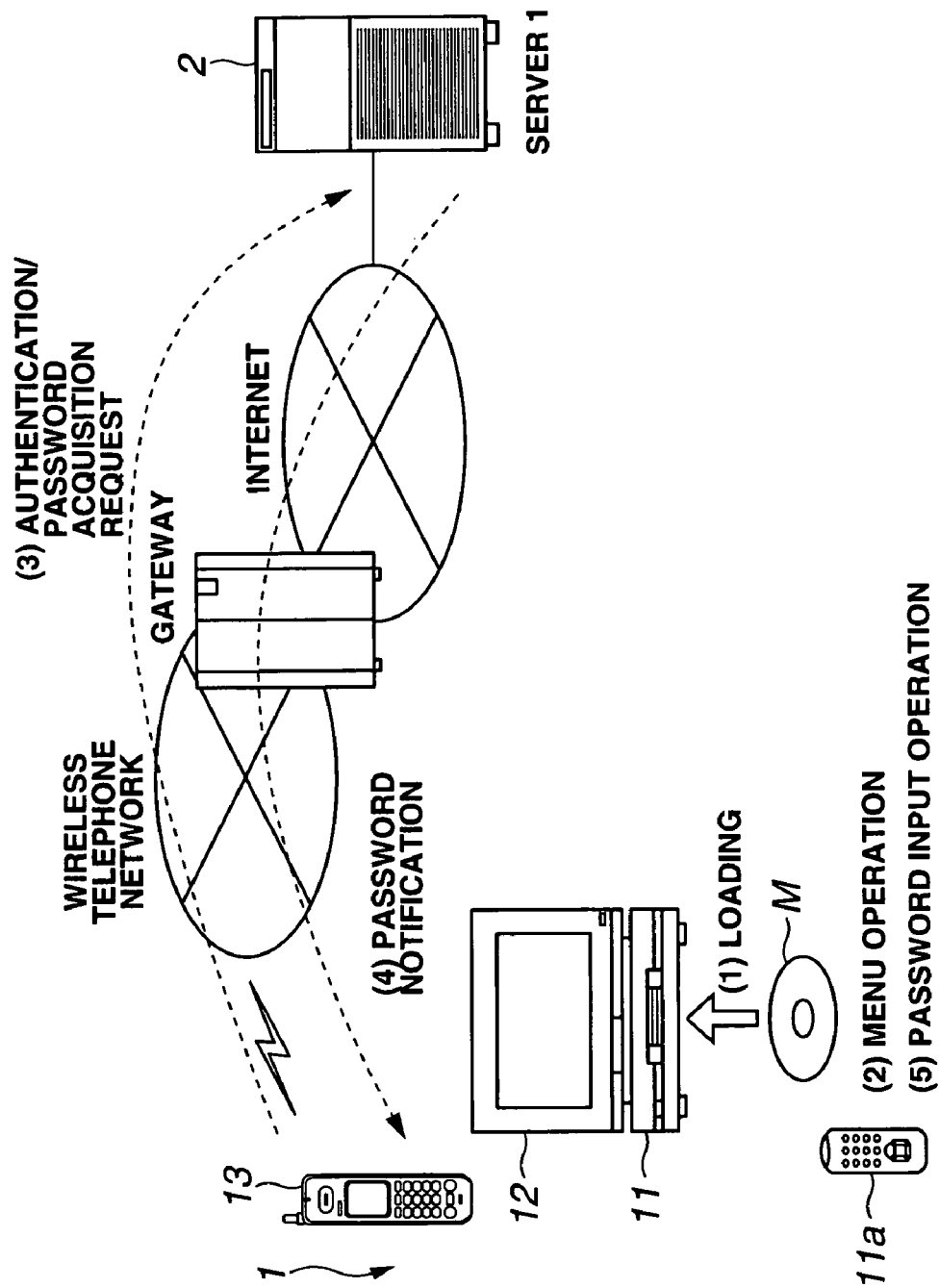
FIG. 1 is a diagram for explaining the viewer management system for realizing the viewing management method according to an embodiment of the present invention.

FIG. 1 is a diagram for explaining the viewer management system for realizing the viewing management method according to the present embodiment. As shown in FIG. 1, this system is constituted from a viewer system 1 on the viewer side for viewing the content recorded on a DVD media M, and a server computer 2 on the media provider side for distributing/providing the DVD media M to the viewer. The DVD media M has various settings for realizing the viewing management method according to the present embodiment.

Specifically, this DVD media M is processed in advance during the production/manufacture process to enable the reproduction of contents only via a prescribed menu to prevent the viewing management target content from being directly reproduced. Control of this kind of reproduction, for example, is able to employ the user operation control (UOP) under the DVD specification, and a setting of prohibiting the respective items of "chapter play", "skip play" and "time designation play" against the program chain (PGC) can be made. Further, direct access to content data from computers and the like will be prohibited. The DVD media M subject to such settings will be able to reproduce contents only via a specified menu.

A viewer system 1 is typically constituted from a DVD player 11 for reproducing the DVD media M according to the DVD-Video, a display device 12 for outputting the signal reproduced with the DVD player 11 as images and sounds, and an information terminal device 13 owned by the viewer.

The DVD player 11 is equipped with a remote controller 11a as the user interface, and an interactive operating environment is provided to the viewer thereby. As a result of the viewer operating the remote controller 11a in relation to the visual contents displayed on the display device 12, such viewer is able to provide various instructions to the DVD player 11. However, the operation panel provided to the body of the DVD player 11 may be used instead of the remote controller 11a.

The information terminal device 13 typically corresponds to a mobile telephone capable of wireless communication, but another device may also be employed. For example, a general telephone capable of emitting a tone signal or a set top box having an interactive function in a digital television service may also be employed. Below, a mobile telephone as the information terminal device 13 will be explained as the example. The mobile telephone 13, in addition to an ordinary wireless telephone function, comprises an email function and Internet connection function. Typically, the mobile telephone 13 is able to exchange emails with a node (e.g., server computer 2) on the Internet via a gateway from a wireless telephone network, and access websites.

The server computer 2 assumes the core role for realizing the viewer management method according to the present embodiment. The server computer 2 performs member authentication processing and viewing management processing to the viewer using the DVD media M. In order to perform such member authentication processing and viewing management processing, the server computer 2 comprises a database system corresponding thereto, and is organically linking such processes and database system. The detailed operation processing of the server computer 2 will be described later.

In the viewer management system constituted as described above, the schematic explanation of the processing flow of the viewer management method according to the present embodiment is as follows.

Incidentally, in addition to the foregoing reproduction regulation setting being made to the DVD media M employed in the viewer management method according to the present embodiment, programs and data for dynamically generating passwords and acquisition codes are also prestored in a prescribed area thereof. Special processing to be performed in this kind of DVD media M may be conducted with the authoring process during the manufacture of the DVD media.

Foremost, as shown in FIG. 1, when the viewer inserts the DVD media M into the DVD player 11, the DVD player 11 reads the disc control information recorded on the DVD media M, and displays the activation menu screen according to such disc control information on the display device 12 ((1) in FIG. 1). This activation menu screen is constituted including with menu items for the media provider to request authentication to the viewer regarding the viewing management target content.

The viewer uses the remote controller 11a to conduct an interactive operation to the presented activation menu screen so as to display a viewer authentication screen on the DVD player side (hereinafter referred to as the "first viewer authentication screen") ((2) in FIG. 1). In this first viewer authentication screen, the viewer is shown an acquisition code, and is requested to input a corresponding password. This acquisition code is set to have different contents each time the viewer makes a content reproduction request. As a result, even in cases where a plurality of viewing management target contents recorded on the DVD media M, a different acquisition code for each reproduction request is presented to the respective contents, and the input of a different password for each case can be requested.

Here, as the result of the viewer accessing the server computer 2 from the mobile telephone 13 and providing the acquisition code, such viewer will be able to acquire a password in exchange therefor. In other words, the viewer uses the mobile telephone 13 to access the website (substantially the server computer 2) indicated by a URL shown on the first viewer authentication screen, inputs the user ID and password as well as the acquisition code shown on the first viewer authentication screen, and acquires the password required for viewing the content of DVD media M ((3) and (4) in FIG. 1). Incidentally, here, the viewer is registered in the server computer 2 as a member, and has previously acquired a prescribed user ID and password.

As described above, the viewer acquires the password from the server computer 2, and inputs the acquired password in the first viewer authentication screen ((5) of FIG. 1). And, the DVD player 11 performs authentication regarding the input password under the execution of the program recorded on the DVD media M, and, when it is judged that such password is valid, it starts the reproduction of the designated content.

Incidentally, when the DVD player 11 succeeds in the authentication regarding the input password, it is preferable that a flag to such effect is stored in the internal memory buffer, and such flag remains effective until the DVD media M is ejected.

As described above, in the present embodiment, upon reproducing a specified content recorded on a DVD media M, the viewer uses the mobile telephone 13 to access the server computer 2 on the Internet and acquire the password with the acquisition code shown on the first viewer authentication screen, and is urged to input such password. Thus, even if it is a stand-along DVD player 11 that does not have a network connection function, it is possible to manage the viewing of contents.

Figure 2:
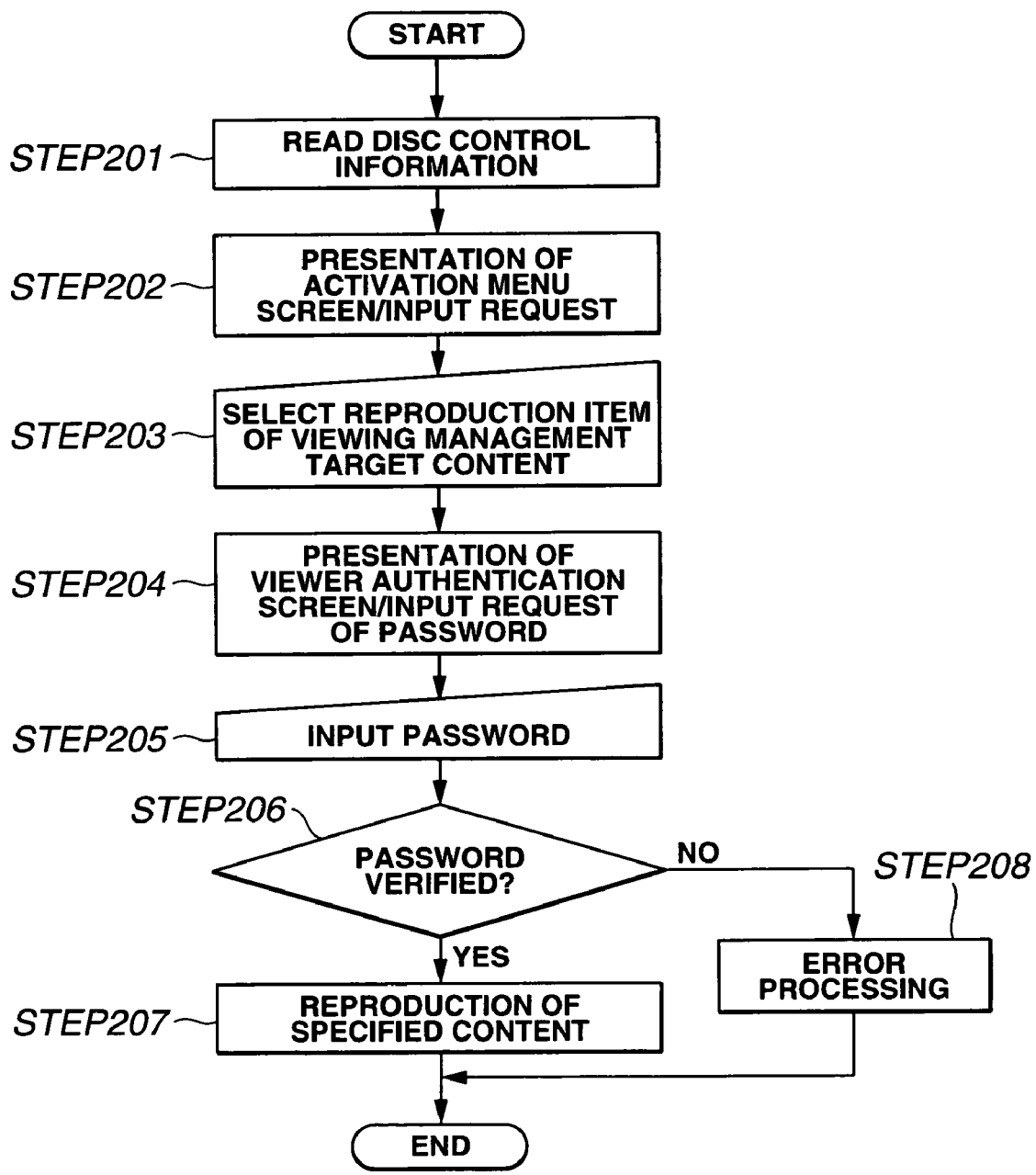
FIG. 2 is a flowchart for explaining the flow of operation of the DVD player 11 according to an embodiment of the present invention.

FIG. 2 is a flowchart for explaining the operation flow of the DVD player 11 according to the present embodiment. Incidentally, although the operation flow is explained sequentially for the sake of convenience below, this is not limited thereto. Therefore, so as long as there is no contradiction with the operation, the processing order may be rearranged or performed in parallel.

In FIG. 2, when the viewer loads the DVD media M into the disc tray of the DVD player 11, the DVD player 11 loads the DVD media M in its internal disc reproduction mechanism, reads the disc control information (STEP 201), displays the activation menu screen according to such disc control information on the display device 12, and requests the viewer to select the content to be reproduced (STEP 202).

FIG. 3 is a diagram showing an example of the activation menu screen according to the present invention. In this activation menu screen, the viewer operates the remote controller 11a at hand to interactively select one among the plurality of contents recorded on the DVD media M. In this example, "video 1" and "video 2" are viewing management target contents, and, with "video 1", the viewer is able to select "with preview" or "without preview".

When the viewer, for instance, selects the item of "video 1 (without preview)", which is a viewing management target content, from this activation menu screen (STEP 203 of FIG. 2), the DVD player 11 displays the first viewer authentication screen associated with the selected item, and requests the viewer to enter the password (STEP 204).

Figure 4:
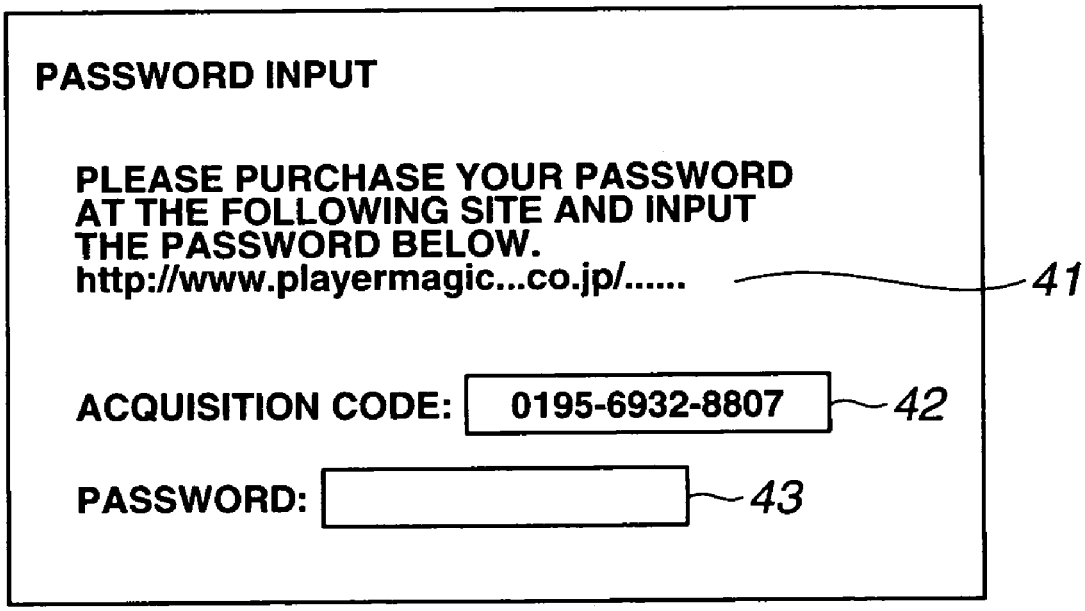
FIG. 4 is a diagram showing an example of the first viewer authentication screen according to an embodiment of the present invention.

FIG. 4 is a diagram showing an example of the first viewer authentication screen according to the present embodiment. This first viewer authentication screen is constituted by including a URL 41 for showing the website to be accessed for acquiring the password, an acquisition code field 42 showing the acquisition code required in acquiring the password, and a password input field 43 to which the password is to be input. In other words, the DVD player 11 dynamically and internally generates an acquisition code based on the disc control information of the DVD media M and according to the execution procedures prescribed therein, displays the first viewer authentication screen including the generated acquisition code, and requests the input of the password corresponding to the acquisition code.

Figure 5:
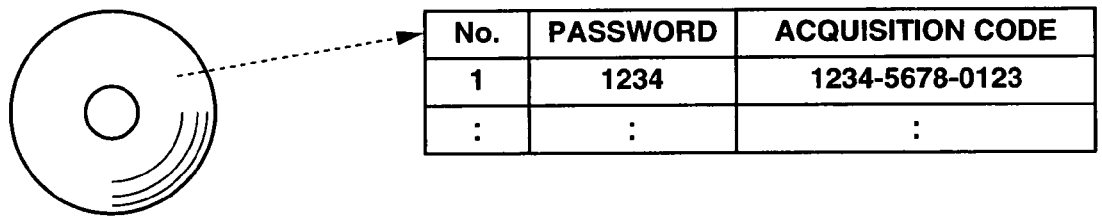
FIG. 5 is a diagram for explaining the password management table according to an embodiment of the present invention.

In order to generation this acquisition code, for example, as shown in FIG. 5, a password management table which associates the password and acquisition code is registered in the DVD media M. Meanwhile, the server computer 2 has a viewing management database containing a table with the same contents as this password table for conducting viewing management employing this acquisition code.

The DVD player 11 generates a prescribed random number with the random generated function, which is an internally incorporated function, according to the execution procedures prescribed in the disc control information, reads the acquisition code corresponding to such random number from the password table, and, as shown in FIG. 4, displays an acquisition code display field 42 of the first viewer authentication screen.

In a state where this first viewer authentication screen is being displayed, the viewer uses the mobile telephone 13 to access the website indicated by the URL 41 of the first viewer authentication screen, and acquires the password via the required viewer authentication. Incidentally, the password acquisition processing will be described later.

When the viewer acquires the password via the prescribed operation procedures from the prescribed website, the viewer operates the remote controller 11a to input the password in the password input field 43 of the first viewer authentication screen, and, for example, pushes the select button (STEP 205 of FIG. 2). When the DVD player 11 receives the password from the viewer, it compares this with the password corresponding to the acquisition code specified previously with the random number registered in the password table, and judges whether the two passwords coincide (STEP 206). When the DVD player 11 judges that the password input from the viewer coincides with the password registered in the password table; that is, when it judges that the input password is valid, a flag showing the success of authentication is stored in the internal memory buffer, and the reproduction of the content is started according to the disc control information (STEP 207). As a result, the viewer will be able to view the viewing management target content that he/she wished to view. Here, it is preferable that the flag showing the success of authentication is stored in the internal memory buffer for each content since viewing will be managed for each viewing management target content.

Incidentally, when the DVD player 11 judges that the input password is not valid, it performs prescribed error processing (STEP 208), and compulsorily ends the processing. Here, instead of compulsorily ending the processing, the process may return to the activation menu screen.

Figure 6:
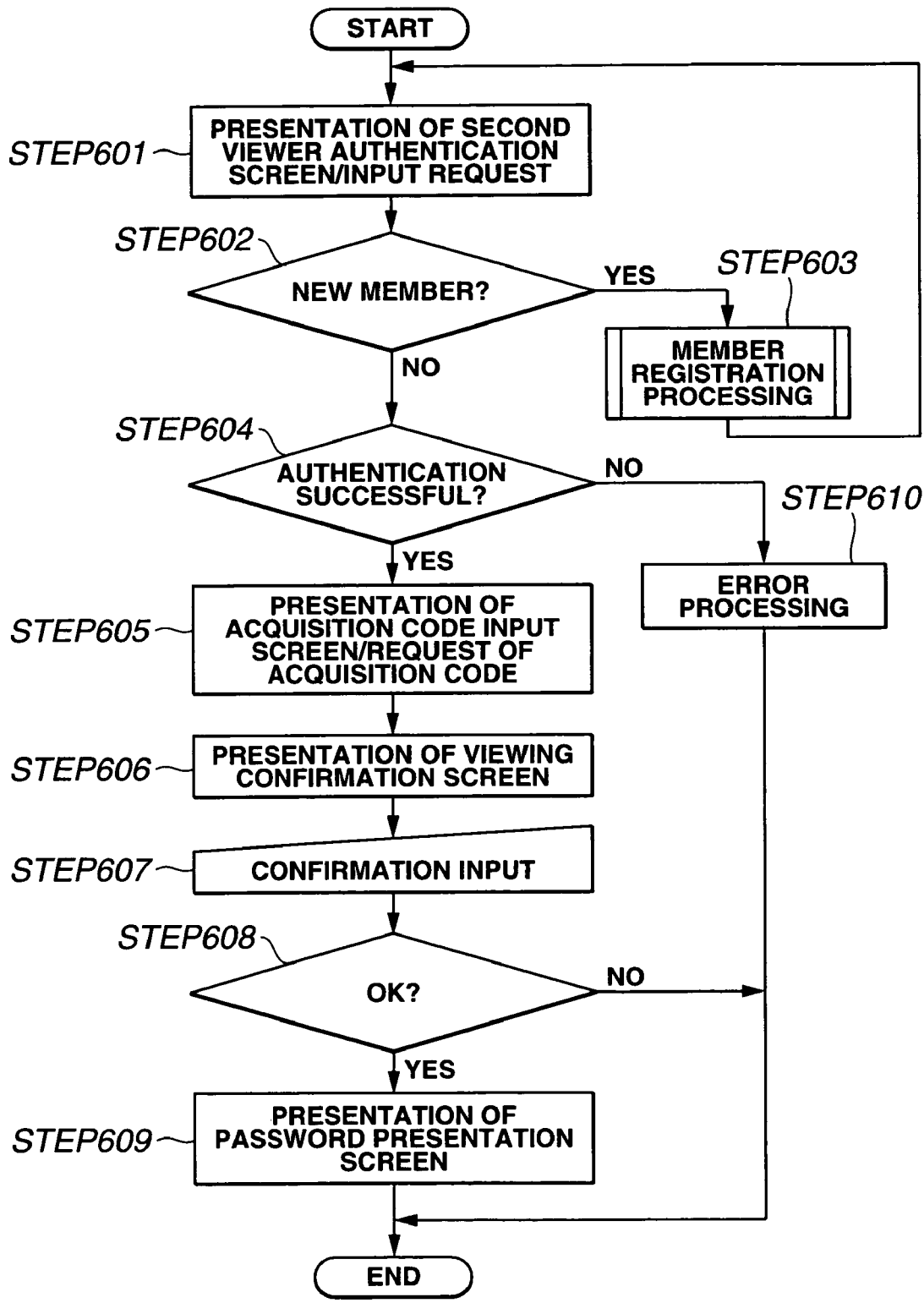
FIG. 6 is a flowchart for explaining the flow of password acquisition processing according to an embodiment of the present invention.

FIG. 6 is a flowchart for explaining the flow of password acquisition processing according to the present embodiment. This password acquisition processing, as described above, is conducted between the mobile telephone 13 and server computer 2.

Figure 7:
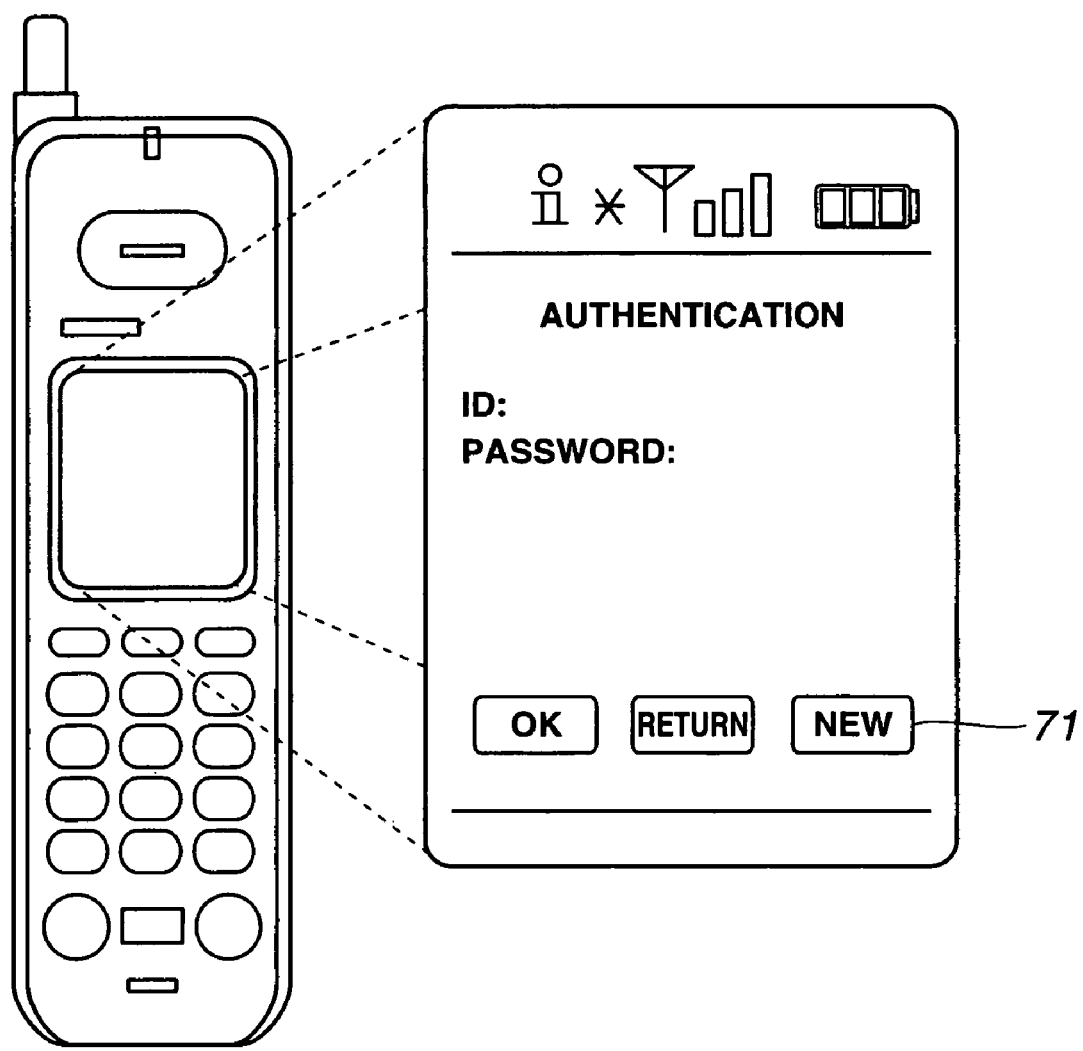
FIG. 7 is a diagram showing an example of the second viewer authentication screen according to an embodiment of the present invention.

As shown in FIG. 6, when the viewer utilizes the Internet connection function of the mobile telephone 13 and accesses the website indicated by the URL 41 on the first viewer authentication screen; that is, accesses the server computer 2, the server computer 2 will respond thereto by displaying on the display unit of the mobile telephone 13 a viewer authentication screen on the mobile telephone side (hereinafter referred to as the "second viewer authentication screen") (STEP 601). FIG. 7 is a diagram showing an example of the second viewer authentication screen according to the present embodiment. Here, when reproducing the viewing management target content, it is necessary that the viewer be registered in advance as a member of the media provider that is providing such DVD media M. Thus, when the viewer has not yet performed member registration, the viewer will select the "new" button 71 on the second viewer authentication screen to conduct member registration procedures (STEPS 602 and 603). As a result of the member registration procedures, the viewer will be assigned a viewer ID and password, and be registered in the database system of the server computer 2. Incidentally, in order to realize the charging processing to the viewer, for example, an effective credit card number or the like may be deposited. As this kind of member registration procedure/charging method, various publicly known methods may be employed, and the explanation thereof is omitted.

When the viewer inputs the ID and password that were personally assigned on the second viewer authentication screen, the mobile telephone 13 transmits the input contents to the server computer 2. The server computer 2 performs authentication based on the ID and password sent from the mobile telephone 13, and judges whether the viewer is a registered member or not (STEP 604). When the server computer 2 judges that the viewer is a registered member, the server computer 2 displays on the display unit of the mobile telephone 13 an acquisition code input screen (STEP 605). Incidentally, when the server computer 2 is not able to authenticate that the viewer is a registered member, it performs prescribed error processing and ends the routine (STEP 610).

Figure 8:
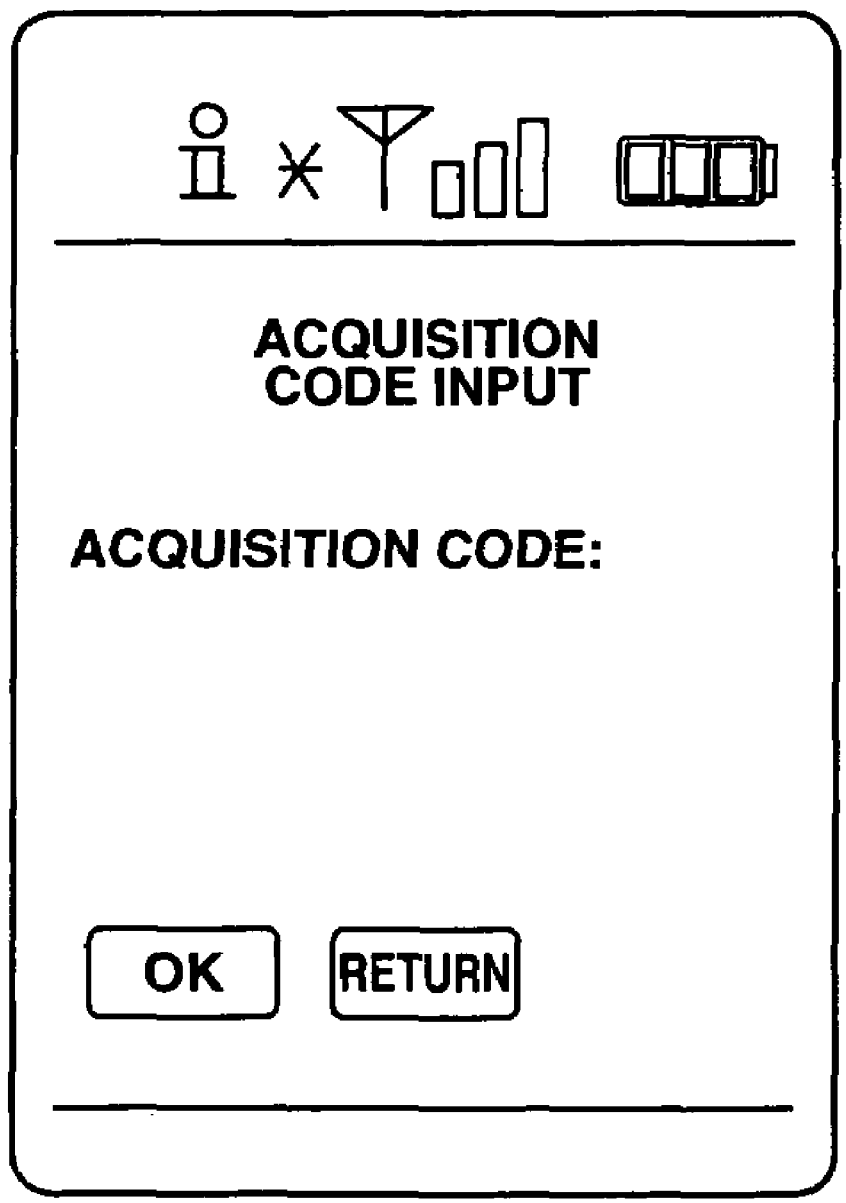
FIG. 8 is a diagram showing an example of the acquisition code input screen according to an embodiment of the present invention.

FIG. 8 is a diagram showing an example of the acquisition code input screen according to the present embodiment. An acquisition code input field for inputting, for example, a 12 digit number is provided to the acquisition code input screen. When the viewer inputs the acquisition code in the acquisition code input field of the acquisition code input screen while referring to the first viewer authentication screen displayed with the DVD player 11 and selects the OK button, the mobile telephone 13 transmits the input contents to the server computer 2. When the server computer 2 receives an acquisition code from an authenticated mobile telephone 13, it refers to the viewing management database system, specifies the contents and viewing conditions (viewing period, price, etc.) of the viewing management target content corresponding to such acquisition code, and displays on the display unit of the mobile telephone 13 the viewing confirmation screen showing such items (STEP 606). Specifically, the server computer 2 refers to the viewing management database, and, foremost acquires the viewing period on the one hand, acquires the current date and time with the clock function on the other, and judges whether the current date and time are within the range of the viewing period. And, when the server computer 2 judges that the current date and time are within the range of the viewing period, it generates a viewing confirmation screen according to the contents of other fields in relation to the acquisition code, and sends this to the mobile telephone 13.

Figure 9:
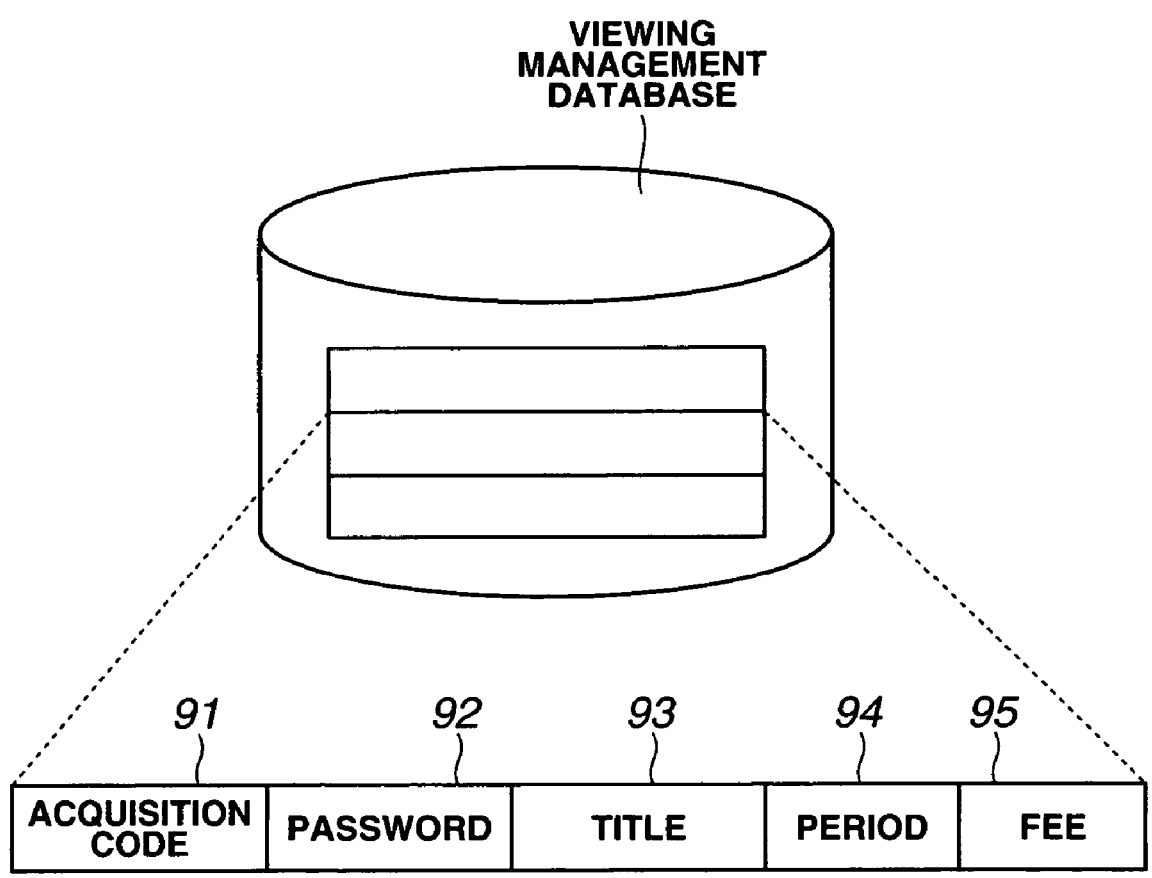
FIG. 9 is a diagram for explaining an example of the data structure of the viewing management database according to an embodiment of the present invention.

FIG. 9 is a diagram for explaining an example of the data structure of the viewing management database of the server computer 2 according to the present embodiment. This viewing management database is used when the server computer 2 conducts the viewing management of contents for the viewer.

As shown in FIG. 9, the respective records of the viewing management database, for example are constituted from the respective fields of acquisition code 91, password 92, title 93, period 94 and price 95. The respective fields of the acquisition code 91 and password 92 are the same as the contents of the password table recorded in the DVD media to be distributed or provided. The title field 93 shows the title of the content, and the period field 94 and fee field 95 show the viewable period (e.g., from when to when) and the viewing fee of the respective contents. In other words, from the perspective of the media provider, it is possible to comprehend the content from the acquisition code, and manage the viewing period and viewing fee of such content.

Figure 10:
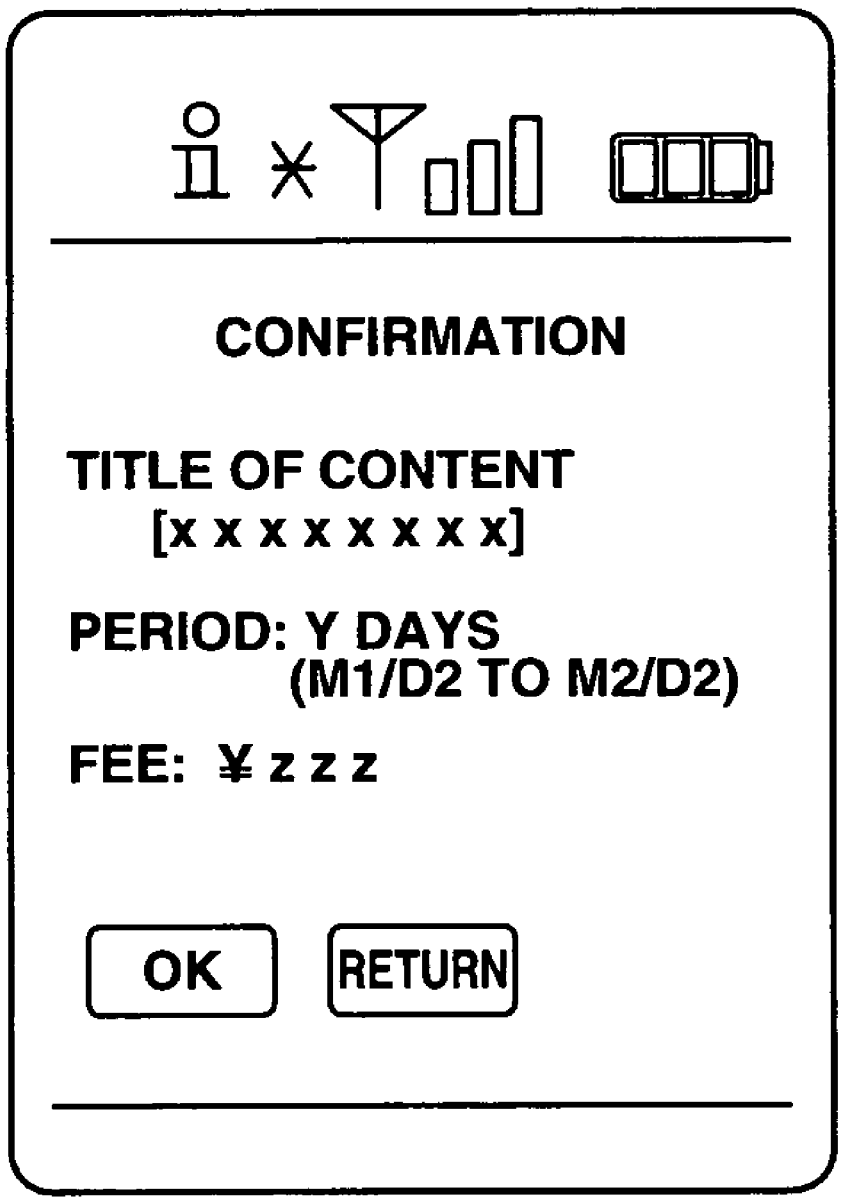
FIG. 10 is a diagram showing an example of the viewing confirmation screen according to an embodiment of the present invention.
Figure 11:
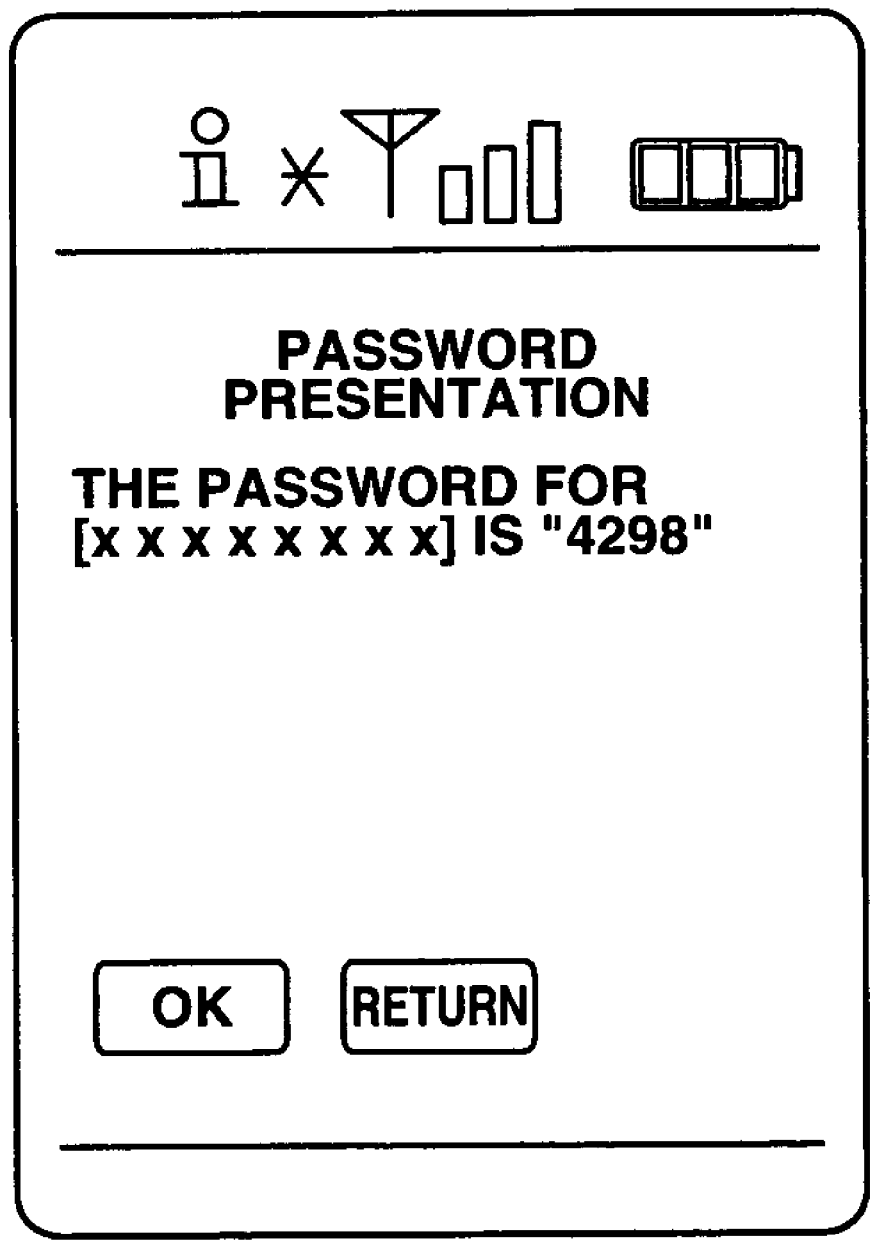
FIG. 11 is a diagram showing an example of the password presentation screen according to an embodiment of the present invention.

FIG. 10 is a diagram showing an example of the viewing confirmation screen according to the present embodiment. When the viewer selects the OK button on this viewing confirmation screen, for example, (STEP 607), the server computer 2 displays the password presentation screen as illustrated in FIG. 11 on the display unit of the mobile telephone 13 (STEP 608 and 609). Here, the server computer 2 charges the viewer for the viewing fee of such content.

Incidentally, as described above, when the DVD media M is ejected, the DVD player 11 will reset the authentication success flag stored for each content in the internal memory buffer, and the viewer will be required to reacquire the password. Here, when the viewer requests for the reacquisition of the password during the viewing period in the server computer 2, it is preferable that the password presentation screen is simply provided, and charging processing is not performed again to such viewer.

As described above, when the viewer uses the mobile telephone 13 and acquires the password, the user then inputs such password in the password input field 43 of the first viewer authentication screen. Thereby, the DVD player 11 will start the reproduction of the viewing management target content.

As described above, according to the present embodiment, upon reproducing a specified content recorded on the DVD media M, the viewer uses the mobile telephone 13 to access the server computer 2 on the Internet and acquire the password with the acquisition code shown on the first viewer authentication screen, and is urged to input such password.

Thus, even if it is a stand-along DVD player 11 that does not have a network connection function, it is possible to manage the viewing of contents.

The foregoing embodiments are exemplifications for explaining the present invention, and the present invention shall not be limited to such embodiments in any way. The present invention may be worked in various forms so as long as the gist hereof is not deviated.

For example, in the present embodiment, although a mobile telephone having an Internet connection function was explained as an example of a portable information terminal device 13, this is not limited thereto. For example, when using an ordinary telephone, the acquisition code and password may be exchanged by conducting an audio-based interactive operation with an audio response system. Further, in the case of a set top box having an interactive function, the acquisition code and password may be exchanged with an interactive operation in relation to a specified data broadcast program.

According to the present invention, provided is a viewing management function in a simple manner while giving consideration to the compatibility with existing visual reproduction devices.

We claim:

1. A viewing management method for managing the viewing of media content recorded on an information recording medium readable with a prescribed reproduction device, said method comprising the following steps:

said prescribed reproduction device presenting an acquisition code prerecorded on said information recording medium to a viewer desiring to view a viewing management target media content;

said prescribed reproduction device receiving a password acquired by the viewer from a server computer based on the acquisition code; and said prescribed reproduction device starting reproduction of said viewing management target media content via an authentication process based on the password, wherein a password management table associating said password with said acquisition code is prerecorded on said information recording medium, and the step of presenting the acquisition code occurs each time a media content reproduction request is received from the viewer and includes:

said prescribed reproduction device generating a random number based on a prescribed random function; and said prescribed reproduction device selecting and presenting an acquisition code corresponding to the generated random number from the password management table.

2. A viewing management method according to claim 1, wherein, when said viewer acquires the password from said server computer, a viewing fee of said viewing management target media content is charged to said viewer.

3. A viewing management method for managing the viewing of media content recorded on an information recording medium readable with a prescribed reproduction device, comprising the following steps:

said prescribed reproduction device starting to read said information recording medium;

said prescribed reproduction device presenting a prescribed acquisition code to a viewer, and urging the viewer to input a prescribed password;

a prescribed server computer accessed by an information terminal device of said viewer urging the viewer to input the prescribed acquisition code;

said prescribed server computer presenting a password corresponding to said prescribed acquisition code to said viewer upon receiving said prescribed acquisition code from the information terminal device of said viewer;

said prescribed reproduction device performing, upon receiving a prescribed password from said viewer, authentication based on the prescribed password; and said prescribed reproduction device starting reproduction of the media content recorded on said information recording medium when it judges that the prescribed password is valid as a result of said authentication, wherein a password management table associating said password with said acquisition code is recorded on said information recording medium, and said prescribed reproduction device presents an acquisition code corresponding to a random number generated according to a prescribed random function.

4. A viewing management method according to claim 3, wherein said server computer comprises a viewing management database containing a table corresponding to said password management table, and wherein a prescribed password corresponding to the prescribed acquisition code received from the information terminal device of said viewer is specified by referring to said viewing management database, and the prescribed password is presented to said viewer.

5. A viewing management method according to any one of claims 3 or 4, wherein a URL for accessing the server computer is recorded on said information recording medium, and said prescribed reproduction device presents said prescribed acquisition code together with said URL.

6. A viewing management method according to claim 3, wherein said viewing management method further comprises a step of urging said viewer to select a viewing management target media content, and when said viewing management target media content is selected, the prescribed acquisition code corresponding to said selected viewing management target media content is presented.

7. A system for reading an information recording medium with a prescribed reproduction device, the system comprising:

a prescribed reproduction device; and an information recording medium having recorded thereon a viewing management target media content, a prescribed password management table and prescribed control information, wherein in said prescribed password management table, a prescribed password is associated with a prescribed acquisition code, and wherein said prescribed control information contains a control program for said prescribed reproduction device to be capable of performing a plurality of functions, the functions comprising:

said prescribed reproduction device presenting a prescribed acquisition code corresponding to a random number generated according to a prescribed random function to said viewer and urging said viewer to input a prescribed password associated with said presented prescribed acquisition code in said prescribed password management table, said prescribed reproduction device performing authentication of said input prescribed password when said viewer inputs said prescribed password, and said prescribed reproduction device reproducing said viewing management target media content according to the result of said authentication.

8. A viewing management method according to claim 3, wherein said server computer comprises a viewing management database containing a table corresponding to said password management table, said table associating said acquisition code with said password, a title of said media content, a period during which said media content is available, and a fee for viewing said media content.

9. A system according to claim 7, wherein said prescribed server computer comprises a viewing management database containing a table corresponding to said password management table, said table associating said acquisition code with said password, a title of said media content, a period during which said media content is available, and a fee for viewing said media content.

* * * * *

UNITED STATES PATENT AND TRADEMARK OFFICE
CERTIFICATE OF CORRECTION

PATENT NO. : 7,725,400 B2  Page 1 of 1
APPLICATION NO. : 10/533875
DATED : May 25, 2010
INVENTOR(S) : Mitsutoshi Shionoya It is certified that error appears in the above-identified patent and that said Letters Patent is hereby corrected as shown below:

Title page, item [73] Assignee, delete "Visionaire" and insert --Visionare--.

Signed and Sealed this

Thirteenth Day of July, 2010

David J. Kappos
*Director of the United States Patent and Trademark Office*